No. 718,543. PATENTED JAN. 13, 1903.
N. O. STARKS.
STORE, LIBRARY, OFFICE, OR WAREHOUSE APPARATUS.
APPLICATION FILED SEPT. 4, 1902.
NO MODEL. 10 SHEETS—SHEET 1.

Witnesses
Inventor:

No. 718,543. PATENTED JAN. 13, 1903.
N. O. STARKS.
STORE, LIBRARY, OFFICE, OR WAREHOUSE APPARATUS.
APPLICATION FILED SEPT. 4, 1902.
NO MODEL. 10 SHEETS—SHEET 3.

Witnesses
D. E. Burdine
Fannie Wise

Inventor:
Nils O. Starks,
by Dodge & Sons
Attorneys.

No. 718,543. PATENTED JAN. 13, 1903.
N. O. STARKS.
STORE, LIBRARY, OFFICE, OR WAREHOUSE APPARATUS.
APPLICATION FILED SEPT. 4, 1902.
NO MODEL. 10 SHEETS—SHEET 6.

Witnesses
Inventor:
Nils O. Starks,
by Dodge and Sons,
Attorneys

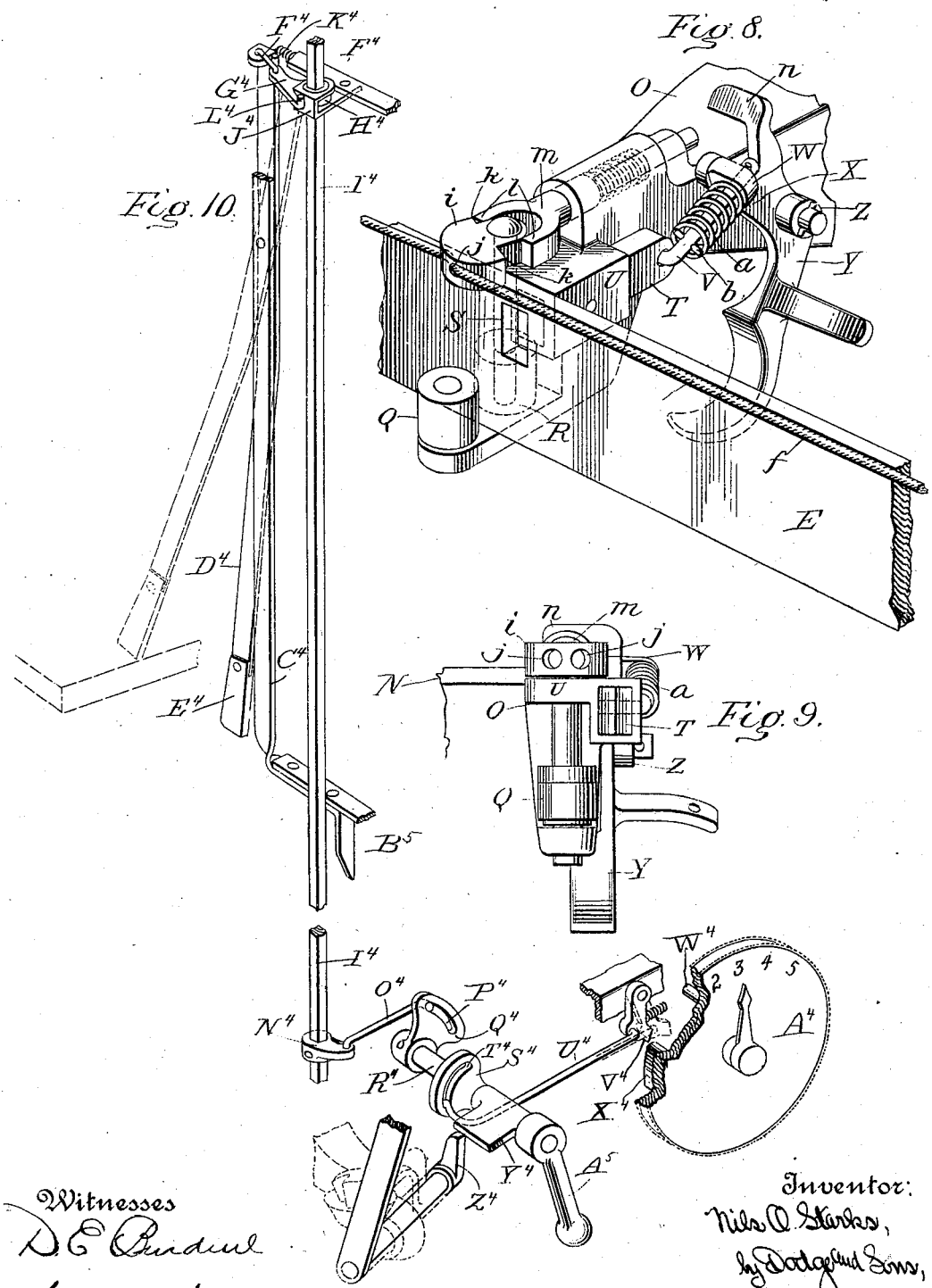

No. 718,543. PATENTED JAN. 13, 1903.
N. O. STARKS.
STORE, LIBRARY, OFFICE, OR WAREHOUSE APPARATUS.
APPLICATION FILED SEPT. 4, 1902.
NO MODEL. 10 SHEETS—SHEET 8.
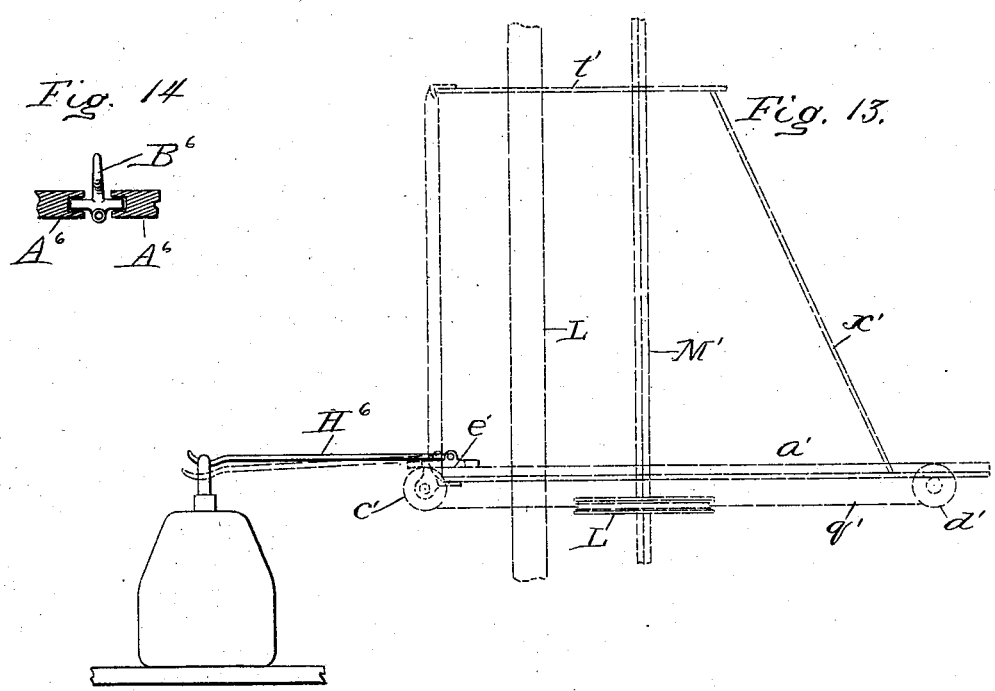
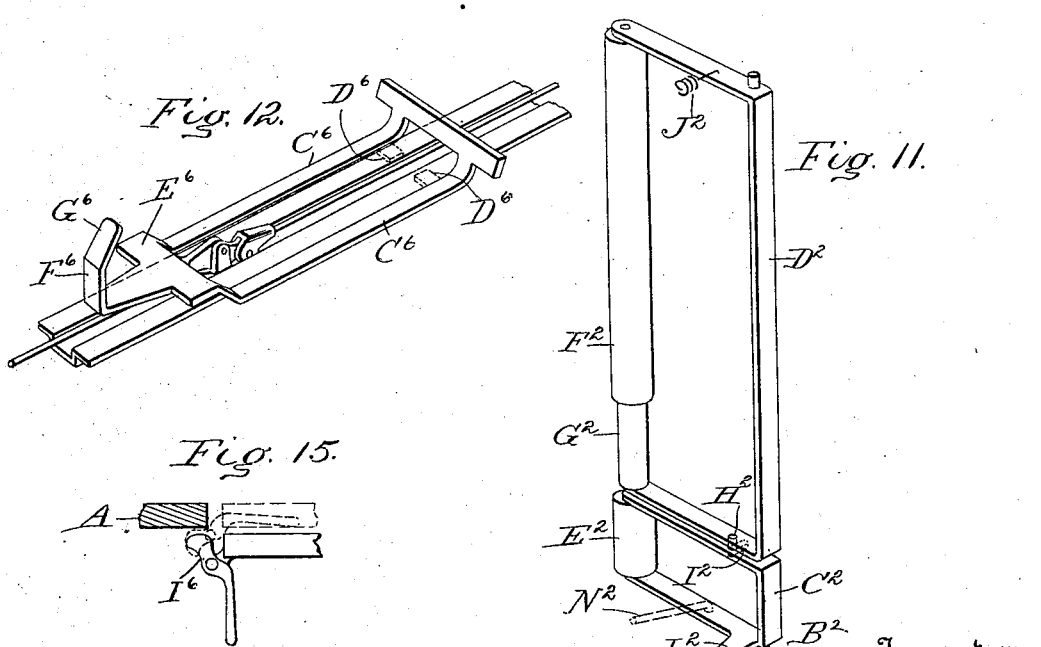
Witnesses
Inventor:

No. 718,543. PATENTED JAN. 13, 1903.
N. O. STARKS.
STORE, LIBRARY, OFFICE, OR WAREHOUSE APPARATUS.
APPLICATION FILED SEPT. 4, 1902.
NO MODEL. 10 SHEETS—SHEET 9.

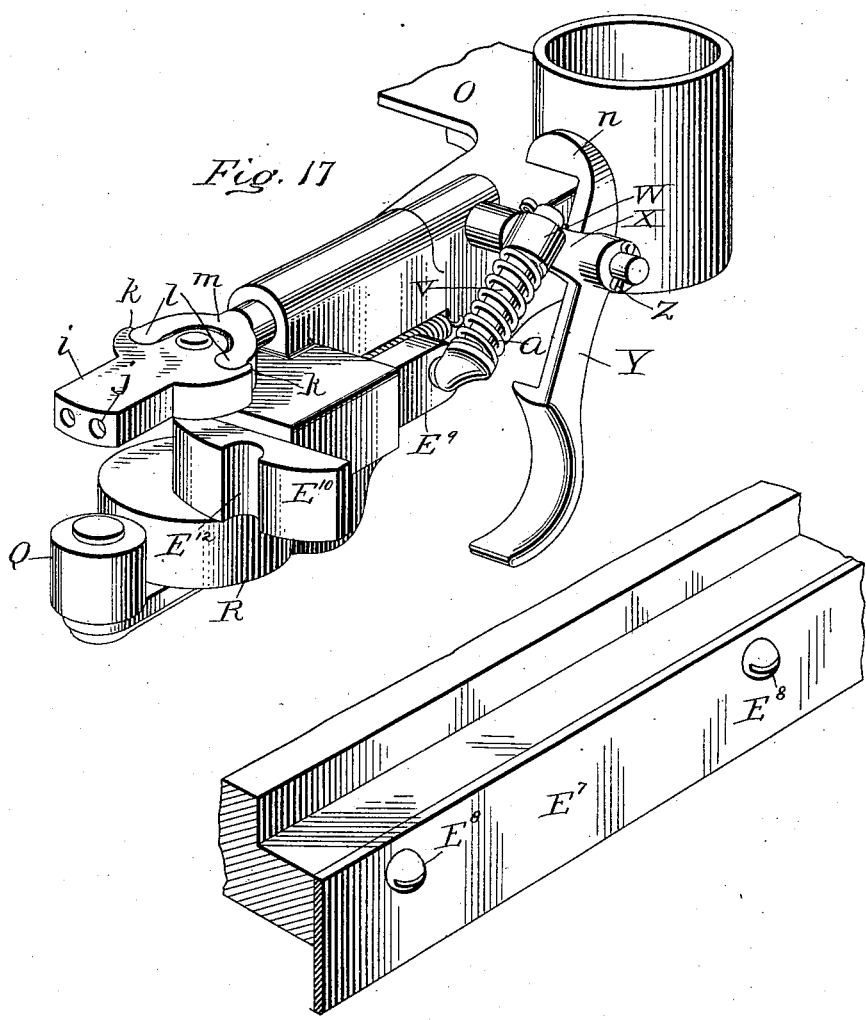

UNITED STATES PATENT OFFICE.

NILS O. STARKS, OF MADISON, WISCONSIN.

STORE, LIBRARY, OFFICE, OR WAREHOUSE APPARATUS.

SPECIFICATION forming part of Letters Patent No. 718,543, dated January 13, 1903.

Application filed September 4, 1902. Serial No. 122,099. (No model.)

*To all whom it may concern:*

Be it known that I, NILS O. STARKS, a citizen of the United States, residing at Madison, in the county of Dane and State of Wisconsin, have invented certain new and useful Improvements in Store, Library, Office, or Warehouse Apparatus, of which the following is a specification.

My present invention relates to store, library, office, and warehouse apparatus, the construction and advantages of which will be hereinafter set forth, reference being had to the annexed drawings, wherein—

Figure 1:
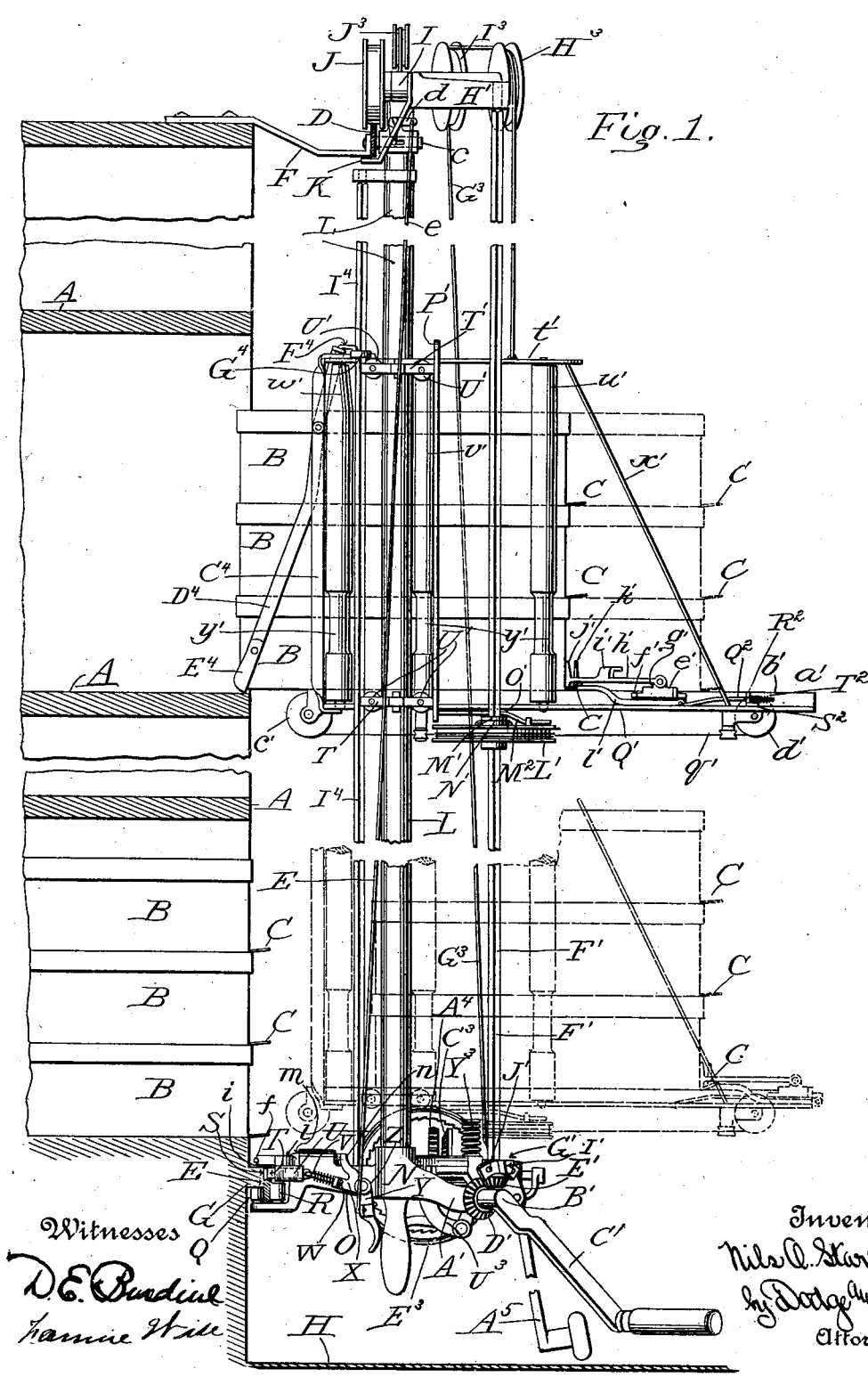
Figure 2:
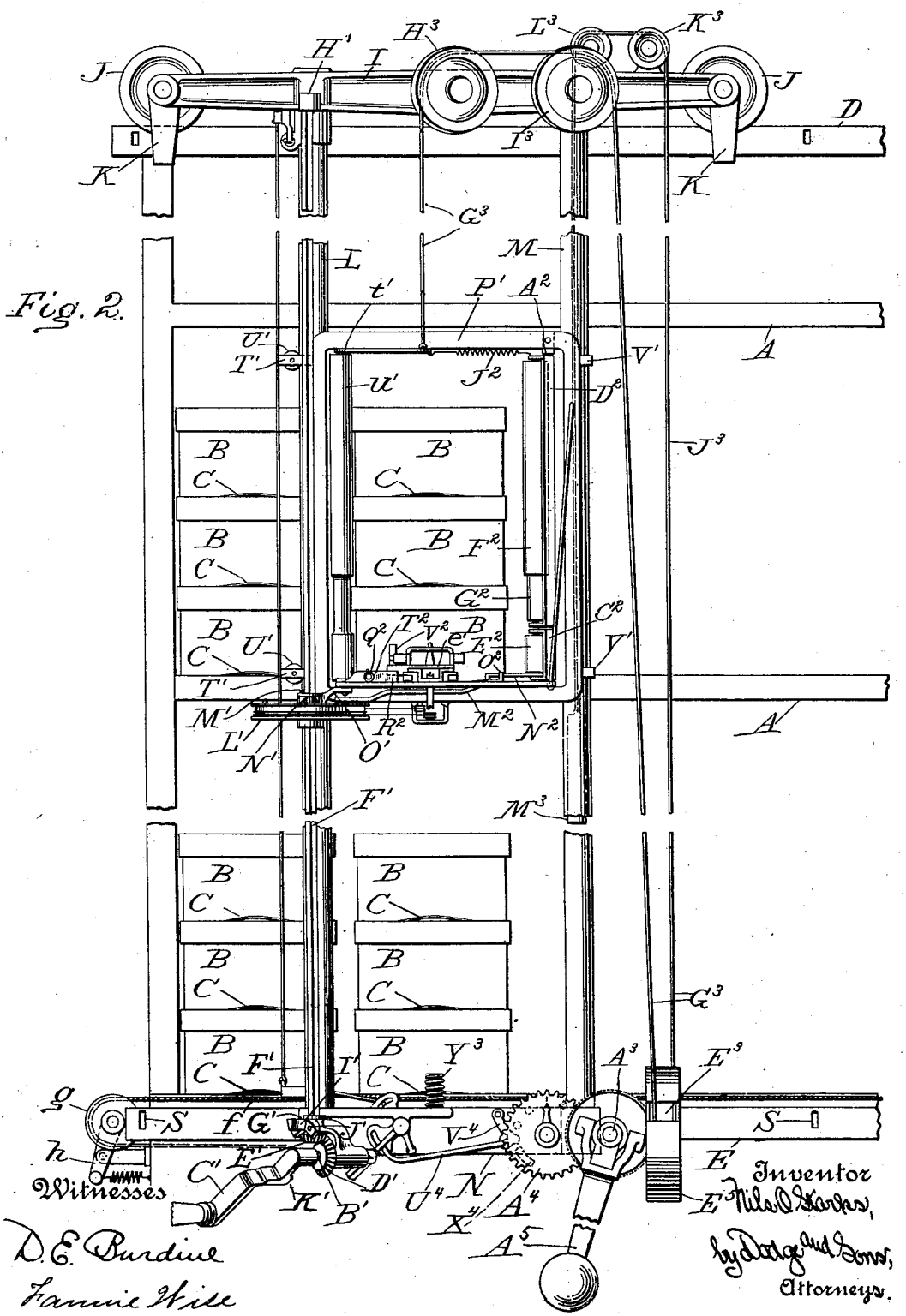
Figure 3:
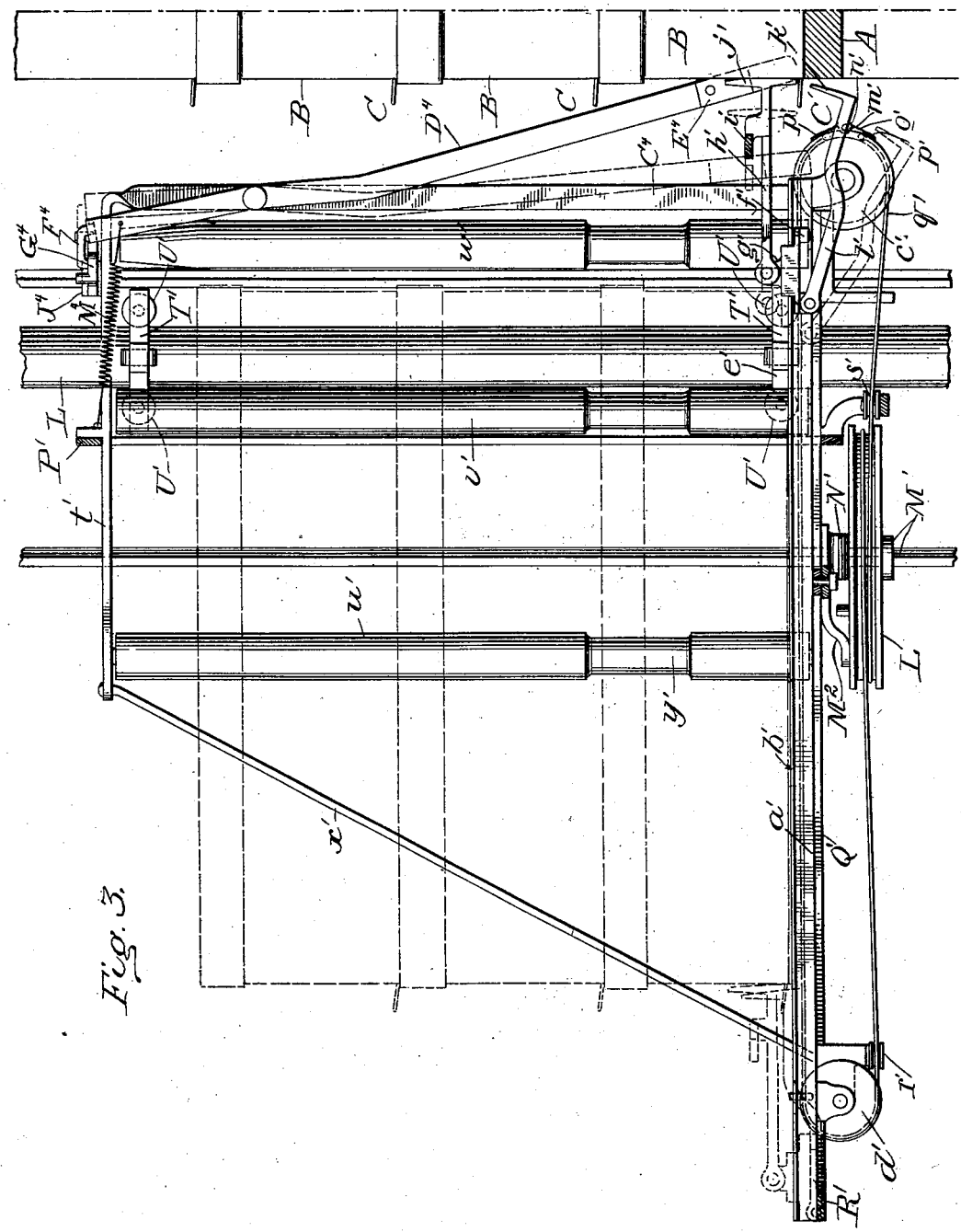
Figure 4:
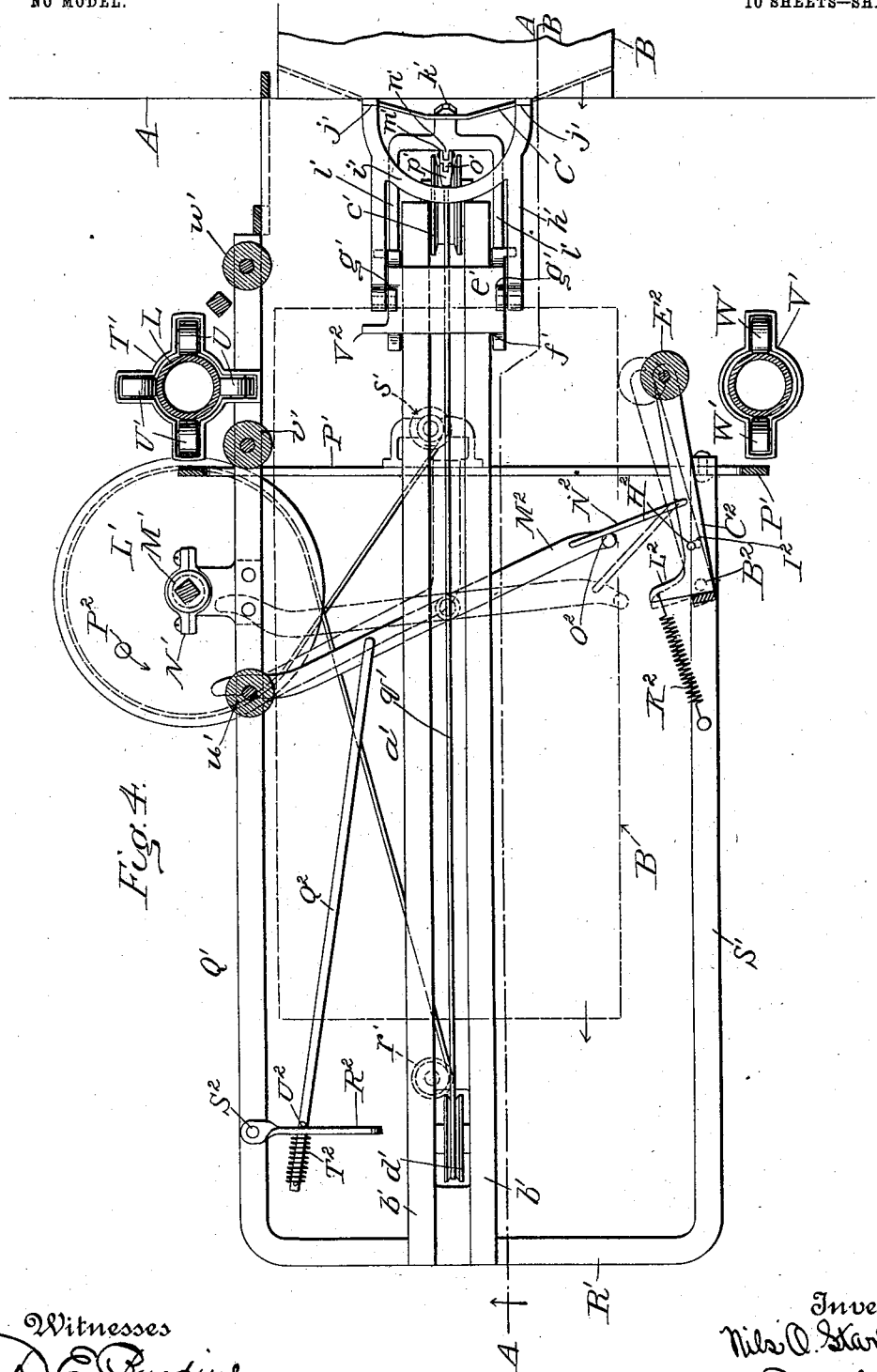
Figure 5:
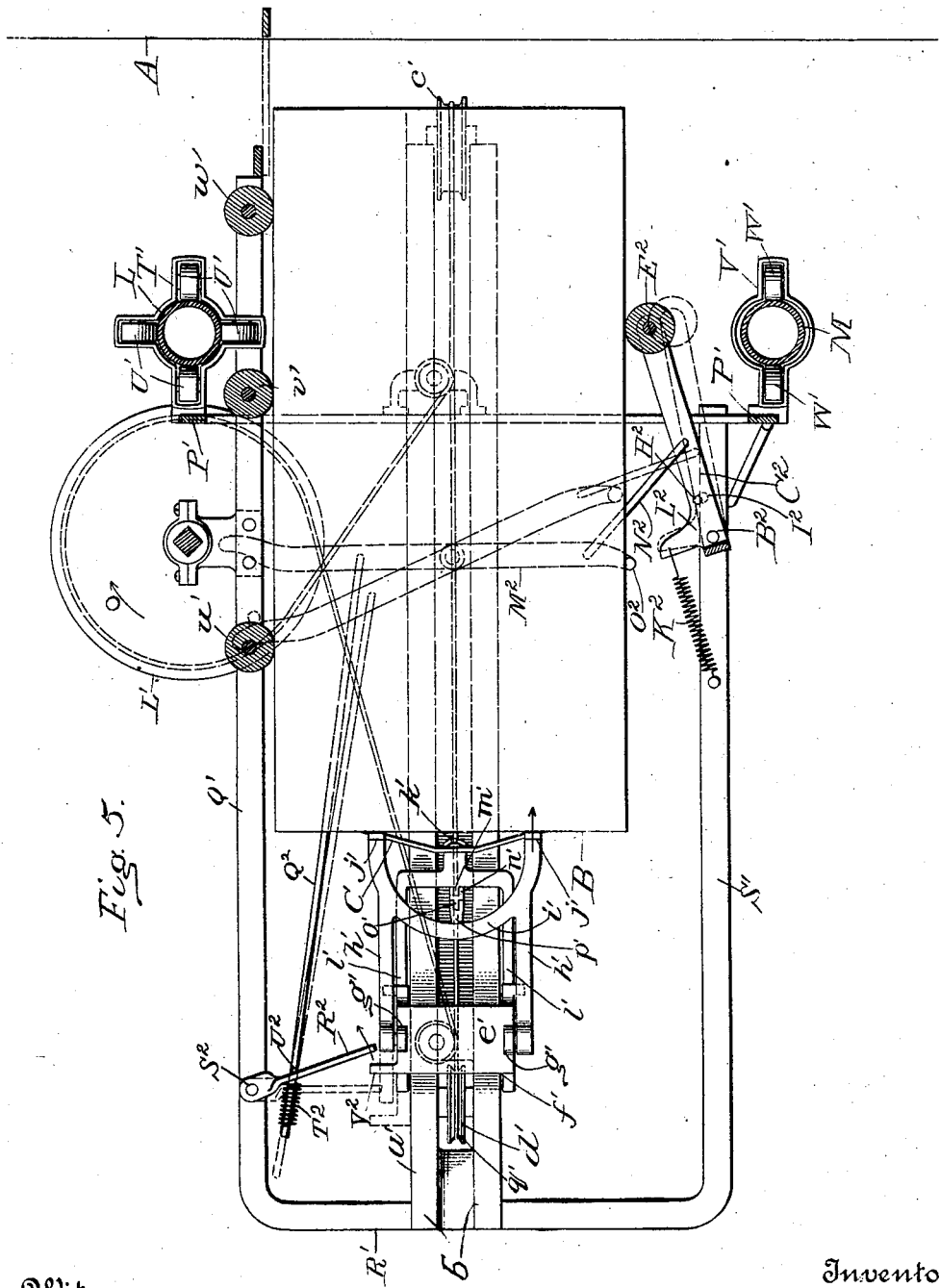
Figure 6:
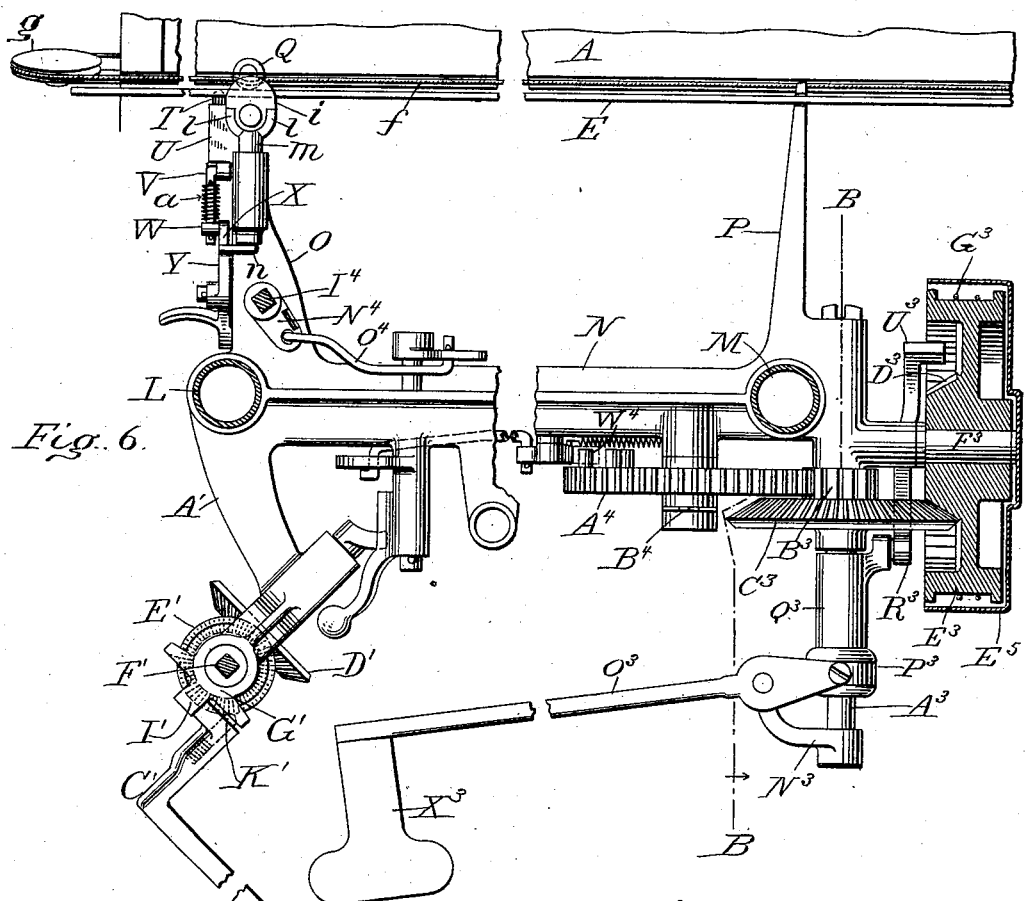
Figure 7:
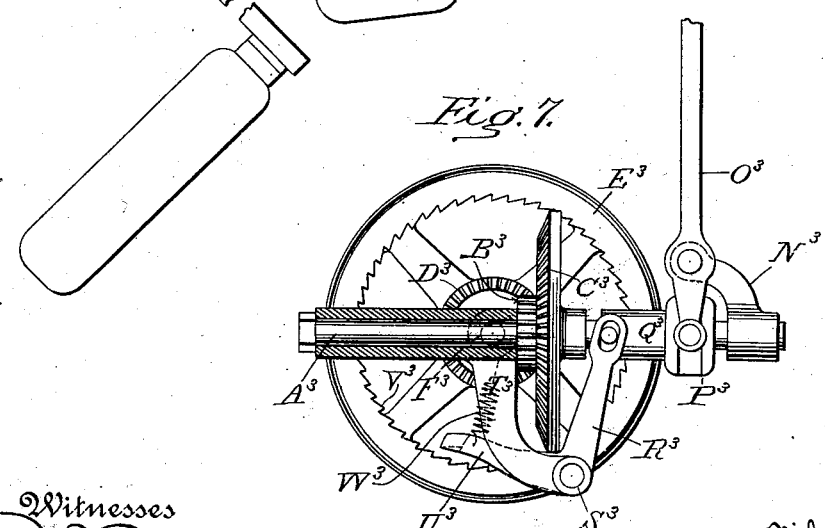
Figure 16:
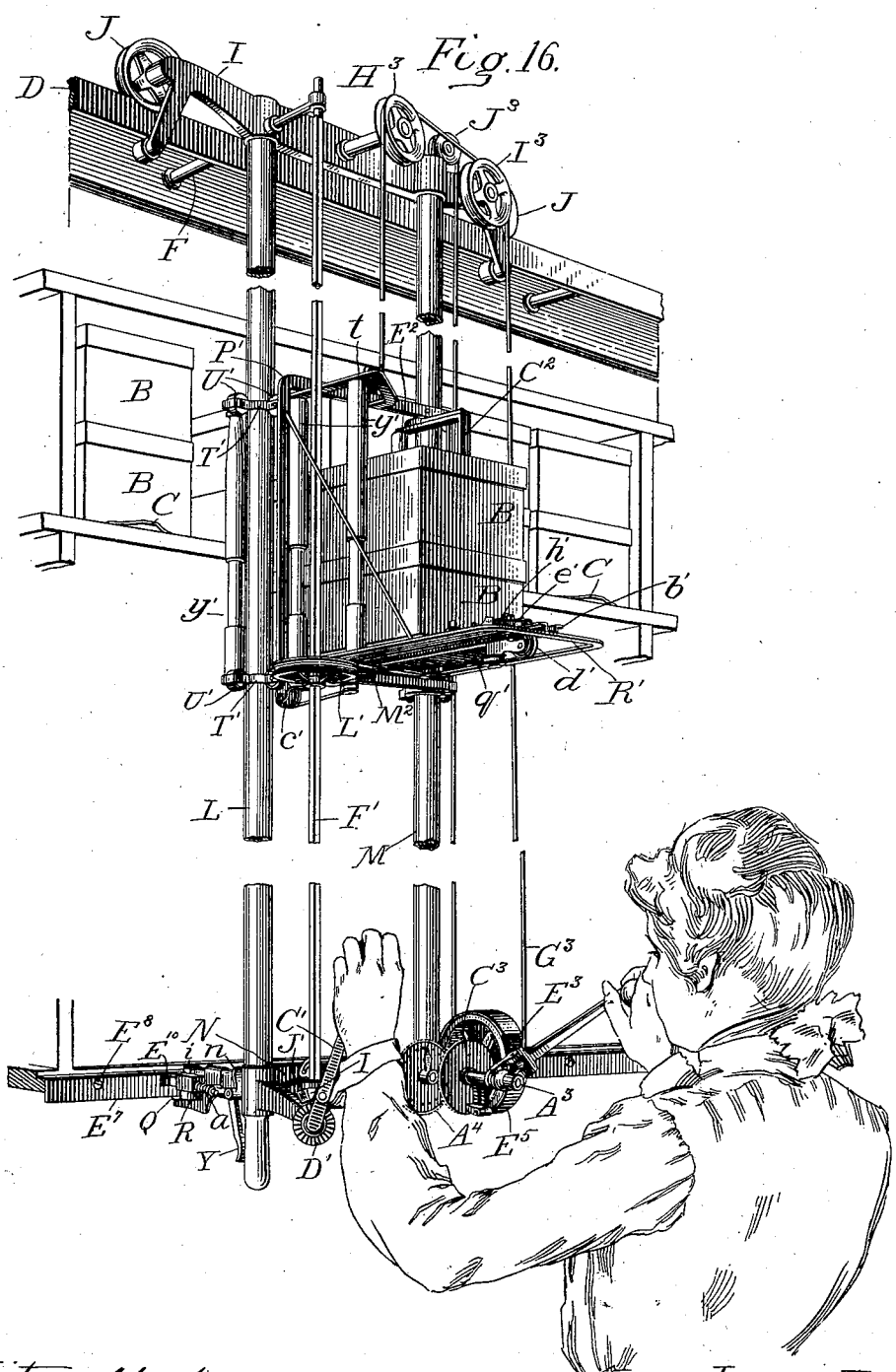

Figure 1 is a side elevation of the apparatus, showing the same in position with relation to a series of shelves for supporting boxes or the like; Fig. 2, a front elevation; Fig. 3, a vertical sectional view, on an enlarged scale, of the carrier or elevator, taken on the line A A of Fig. 4; Fig. 4, a top plan view of the carrier or elevator, the guiding-rolls and supporting-columns being shown in section and the parts illustrated in position for withdrawing a box from the shelf; Fig. 5, a similar view, the box resting upon the carrier and being moved inwardly onto a shelf; Fig. 6, a top plan view, partly in section, of the operating and controlling mechanism; Fig. 7, a detail view of the clutch and locking mechanism employed in connection with the operating-crank, the section being taken on the line B B of Fig. 6; Fig. 8, a perspective view of the mechanism employed to lock the apparatus against movement on the supporting-rails and also to free the lock from engagement with the rails and permit further traverse of the apparatus to any desired position; Fig. 9, an elevation of said parts; Fig. 10, a perspective view of certain portions of the apparatus for properly positioning the elevator or carrier with reference to a shelf; Fig. 11, a similar view of the movable frame carrying one pair of the guide or positioning rollers; Fig. 12, a perspective view of a modified form of carrier-hook; Fig. 13, a view showing certain other modifications; Fig. 14, a detail view illustrative of a modified form of track or guide for the carrier; Fig. 15, a similar view showing a visual indicator for showing the position of the elevator in relation to any particular shelf; Fig. 16, a perspective view of the complete apparatus, showing a slightly-modified form of track and locking device; and Fig. 17, a perspective view of the modified locking device and a portion of the lower track.

The main object of my invention is to provide a simple and efficient apparatus for removing merchandise, books, boxes, files, racks, and cases from their supports and replacing them thereon at will, the apparatus being especially efficient in the handling of boxed merchandise, bottle and book racks, filing-cases, drawers, &c. By the use of this apparatus boxes or the like may be removed from any shelf or support and, if so desired, as readily replaced or restored to their former positions. The structure is so arranged that it may be traversed the entire length of the shelving or the like and the elevator, with its engaging and replacing member, brought into direct alinement with the particular box or the like desired.

The apparatus about to be described has in practice given highly-satisfactory service, and its many advantages will hereinafter specifically appear.

Referring first to the construction illustrated in Figs. 1 to 11, inclusive, A denotes a series of shelves, upon which rest a series of boxes B, each box being provided at its outer lower edge with a projecting bail or loop C or similar device.

Upon reference to Figs. 1 and 2 it will be noted that the apparatus is supported by two tracks or rails D and E, the upper track D being sustained by suitable brackets or arms F, extending outwardly from the shelving. The lower track E is secured to a rail or bead G, which extends outwardly from the face of the shelf structure at a point above the counter H thereof. As will be seen upon reference to Fig. 1, the apparatus stands entirely within the edge limits of the counter, and as a consequence the floor-space is left entirely clear and unobstructed.

I denotes a cross-head, having at its outer ends grooved rolls J, which bear upon the upper face or edge of track D, while arms K extend downwardly from the cross-head beneath the track and prevent the cross-head from rising and the rolls from jumping from the track. Extending from the cross-head are two vertically-disposed columns L and M, the columns by preference being hollow. A second cross-head N is connected to the lower ends thereof, and extending out therefrom are arms O and P. Arm O carries two vertically-disposed rolls Q and R, which embrace rail E upon its opposite faces and prevent the frame from swinging outwardly. The inner end of the arm P is cut away or given a hooked form, and the lower rail E passes therethrough, as best indicated in Fig. 6.

The upper and lower cross-heads and the vertical columns, which are arranged between them, form, in effect, a frame, which may be traversed back and forth throughout the length of the rails and be brought in line with any particular box or series of boxes carried or supported by the shelving. In order that the frame thus constructed may be properly held in position as the elevator is moved up and down thereon, I employ latches or bolts, which work in conjunction with openings or slots S, formed in the upper and lower rails. T denotes the bolt or latch for the lower rail. It is mounted to slide in a box U, formed as a part of the member or arm O. The forward end of the latch or bolt T is preferably beveled, so that it will readily enter the opening in the rail. Pivotally connected to the rear end of the bolt is an arm V, which in turn passes through a stud W, which is pivotally connected to an arm X, forming part of a lever or handle Y, said arm being fulcrumed upon a pin or post Z. A coiled spring $a$ encircles the arm V and is held up against the face of the stud W by a cross-pin $b$, which extends through said arm V. The parts are so proportioned that the arm V and lever Y form, in effect, a toggle-joint, so that if the parts are brought to one or the other side of the center line they will be locked in that position against any ordinary movement. Spring $a$ is put under slight compression as the centers are brought into line, and as a consequence as the parts pass the line of centers the spring expands and tends to normally hold them in one or the other position, as the case may be. A second sliding bolt or latch $c$ is carried by the upper cross-head I in line with the opening formed in the upper track D. This bolt is operated in unison with the lower latch by a bell-crank lever $d$ and a wire $e$, which connects said lever with the handle Y. By operating the handle or lever Y it will be seen that both the upper and lower bolts are withdrawn from engagement with the tracks or permitted to enter the openings S when the frame comes into proper position to allow such entrance. The upper bolt may, if desired, be omitted or a construction hereinafter described be employed in lieu of that just set forth.

In order that the frame, with its attached parts, may be traversed back and forth on the tracks without the necessity of the attendant going to the apparatus, I provide means whereby the structure as a whole may be moved to any desired point upon the rails from any position along the length of the track. This is accomplished by the employment of an endless rope, cable, or the like, (designated by the letter $f$,) which, as best shown in Figs. 2, 6, and 8, passes about pulleys $g$ $g$, one of which, Fig. 2, is carried at one end of a pivoted arm or lever $h$, the opposite end of said arm or lever being connected to a spring which tends to draw the lower end of the arm inwardly, and consequently to place the endless cable $f$ under tension. As will be understood upon reference to Fig. 1, the upper stretch of this band or cable lies just above the bead G, but below the upper face of the lowermost shelf or support, so that while the cable or band may be readily grasped at any point throughout its length and drawn outwardly to cause a traverse of the frame or carriage in one or the other direction it is nevertheless normally out of the way.

Pivoted to the outer end of the arm O is a block $i$, to which the band or cable $f$ is secured. A ready means of attachment is provided by forming two openings $j$, Fig. 9, in the forward rounded face of said block $i$, through which the band or cable $f$ is passed, the edges of the walls forming the openings biting upon the band or cable and preventing it from being drawn therethrough. The block $i$ is provided with shoulders or abutments $k$, which work in conjunction with the forked ends $l$ of a sliding bolt or plunger $m$, which is normally pressed toward the block by a spring which encircles the bolt or plunger, as best indicated in Fig. 8. The rear end of said bolt or plunger $m$ comes into direct alinement with a bearing plate or member $n$, formed as a part of the lever or handle Y. When the sliding bolt or latch T is in engagement with the rail, the member $n$ rests directly against the rear end of the bolt $m$, and the block $i$ is drawn around to the position indicated in Fig. 6, where it will be seen that the forked members $l$ bear directly against the shoulders or abutments $k$ of the block $i$.

So long as the parts are in the positions indicated in Fig. 6 the frame or carriage cannot be traversed along the track; but should it be desired by the attendant to cause the frame to be moved along all that it is necessary to do is to either operate the handle Y directly, which will of course withdraw both the upper and lower sliding bolts from engagement with the track, or take hold of the band or cable $f$, pulling it in the desired direction, which will cause the parts to assume the positions shown in Fig. 8.

The operation of the parts will be readily understood. The block $i$, swinging about its pivot, forces the bolt or plunger $m$ backwardly, and the rearwardly-projecting end of said bolt bears against the face of the member $n$, causing the lever or handle Y to rock about its pivot and withdraw the latch or bolt T through the agency of the arm V and the pivoted stud W, to which it is attached. As soon as the parts pass the center the spring $a$ causes the members to quickly assume the positions shown in Fig. 8 and to maintain such positions until the latches are again manually operated to bring them into engagement with the openings S, formed in the rails.

Extending out from the lower frame or member N, at the left-hand side thereof, is an arm A', in which is journaled a shaft B', having secured upon its outer end a crank C'. Said shaft B' also carries a bevel-gear D', which meshes with a similar gear E', secured to the lower end of a squared shaft F'. This shaft is supported at its lower end in a bracket or arm G' and at its upper end in a similar bracket or arm H' on the cross-head I. Arm G' is provided with a stop or lug I', which serves to limit the movement of the crank or handle C'. Sockets or depressions J' are formed in the face of the bracket or arm G', as shown in Fig. 1, and a spring-pressed pin K', carried by the crank, works in conjunction with said sockets or depressions. These sockets are so arrranged with relation to the stop that when the crank is drawn around so that it comes in contact with the stop and pressure is withdrawn from the handle of the crank the spring latch or bolt will by reason of its rounded face have a tendency to draw the crank backward to a slight extent, thereby rotating the squared shaft slightly in a direction reverse to that in which it was moved by the crank, and consequently relieving the wheel L', which is slidingly mounted upon the shaft, from any binding or cramping action that might otherwise take place between the shaft and the wheel. The pin also tends to hold the crank in the position in which it is left by the operator. The wheel L' is provided with an elongated hub M', which works in a box or journal-bearing N', formed in or carried by the outer end of a bracket O', which in turn is secured to the elevator-frame. This frame comprises an upright rectangular section or member P' and an elongated frame composed of the members Q' R' S', which is secured to the lower cross-bar or member of the vertical frame P'. Secured to each of the upper and lower ends of the vertical or upright member P' is a frame T', in which are journaled four rollers or wheels U', which bear against the face of the vertical column or upright member L. Upon the opposite side of the frame P' are secured frames or brackets V', in which are journaled rollers W', only two rollers being used in these frames, which rollers bear against the forward and rear face of the vertical column M. It will thus be seen that the upright frame P' and the lower horizontal frame which is secured thereto are properly held in position in front of the vertical standards or columns L and M. The strap which comprises the bracket or frame V' is so formed that it stands at a distance from the vertical column M in order that the rollers W', carried thereby, may move laterally with relation to the vertical axis of the column M, so as to accommodate themselves to the column in case there should be any deflection between the columns L and M. The rollers U', bearing upon the four faces of the upright column L, will of course cause the elevator-frame to follow that column throughout its length, the rollers W' accommodating themselves to any deflection there may be between the parallelism of the columns L and M.

Secured to the horizontal member of the elevator-frame is a track or way $a'$, which in the preferred construction takes the form of a channeled bar having laterally-extending wings or flanges $b'$. This track or way extends from the outermost member R' of the horizontal frame to a point in close proximity to the edge of the shelving and at its innermost end is provided with a pulley or sheave wheel $c'$. A similar wheel $d'$ is mounted in the track or way at a point near the outer end thereof, the upper edges of both wheels lying in a plane slightly above the face of the channel or groove of the track. Mounted upon said track or way and arranged to be moved back and forth thereon in the manner hereinafter set forth is a block or casting $e'$, the main body of which bears directly upon the flanges $b'$ of the track or way, while fingers or lugs $f'$, formed integral with the body portion, extend in beneath the flanges $b'$ and hold the block or casting down upon the track or way. Pivoted to the lugs $g'$, extending upwardly from the main body of the block or casting, is a push-frame comprising two members $h'$, connected by a curved member $i'$, the frame as a whole having at its forward end two vertically-disposed members or arms $j'$, which when the device is in operation and a box is being shoved into place bear directly against the face of the box, as best shown in Fig. 3. A hook $k'$ is carried at the outer end of a pair of arms $l'$, pivotally attached at their inner ends to the lower portion of the block or casting $e'$, the arms being curved, as shown in Figs. 1 and 3, so that while the main portion thereof occupies a position below the block or casting $e'$ the forward portion extends upwardly and brings the hook into approximate alinement with the side bars or members $h'$, which carry the members $j'$. This is best shown in Fig. 1, in which the hook is in its elevated or normal position.

Formed integral with the members $l'$ and in rear of the hook $k'$ is a lug $m'$, which has an opening formed therein for the reception of a bolt or pin which passes through ears $n'$ of a link or connecting member $o'$. To the outer ends of this link are pivotally connected blocks $p'$, to which in turn are secured the ends of a band or cable $q'$. This band or cable, as will be seen upon reference to Figs. 1, 3, 4, and 5, passes about the sheaves $c'$ and $d'$ and about idlers $r'$ and $s'$, carried by brackets secured to the track or way and the lower member of the upright frame, respectively, and likewise about the sheave-wheel L'.

The band is passed several times about said wheel L', being at one point permanently secured thereto.

As will be readily understood from the foregoing description, a movement of the crank or handle C' will cause the squared shaft F' to rotate, thereby rotating the wheel L', and consequently imparting movement to the band or cable $q'$. This in turn through its connection with the hook member will cause the frame, with the hook and the push member, to be moved back and forth upon the guide or way.

The parts are so proportioned that when the elevator is brought into proper alinement with a particular shelf, or approximately so, in a manner to be hereinafter fully set forth the hook will when moved inwardly into the position shown in Fig. 3 be in position to engage one of the fastenings or clips secured to the lowermost box upon the shelf. A movement of the lever or handle C' in the proper direction will thus cause the hook to move upwardly through the bail or clip on the box and withdraw the box and those superimposed upon it outward upon the elevator to the position shown in dotted lines in Fig. 3. The elevator is then lowered and the box is withdrawn, if desired. A reverse movement of the handle when the elevator is properly positioned with reference to a shelf will cause the boxes to move inwardly, the push member bearing at all times against the forward face of the lower box and pushing it squarely back to place, after which the hook drops down into the position shown in Fig. 3, thereby disengaging itself from the bail upon the box. As will be noted, the hook has a substantially vertical movement adjacent to the box end, so that should the parts be not quite accurately adjusted the hook will nevertheless engage the box and withdraw the same, lifting it slightly, if necessary, to draw it onto the elevator.

In order to properly position the boxes as they are being moved in upon the elevator or carrier, I employ guide-rollers, which when the boxes are being drawn out on the elevator are normally out of action, but which when the boxes are being pushed to position are automatically brought into action and properly position and direct the movements of the boxes.

The left-hand member Q' of the horizontal section of the elevator is extended inwardly beyond the vertical column L, as shown in Fig. 4.

A second horizontal frame $t'$ is secured to the upper member of the vertical frame P', said frame or member $t'$ forming the support for the upper ends of the three vertically-disposed guide-rolls $u'$, $v'$, and $w'$, the lower ends of which find their support in the member Q' of the lower horizontal frame. A brace or support $x'$ extends from the upper frame $t'$ to the member Q' of the lower frame. As will be seen upon reference to Fig. 3, the rollers are cut away throughout a portion of their length, as at $y'$, in order that the lid of the box may not touch the rollers, or at least no lateral or side pressure will be exerted upon the cover by the rollers when the opposite roller or rollers come into operation and tend to force the box over toward the three rolls just referred to.

Extending outward from the upper member of the vertical frame P' is an arm or bracket $A^2$, while extending upwardly from the member S' is a post or column $B^2$. A frame $C^2$ is mounted upon the post $B^2$, while a second frame $D^2$ is mounted between the post $B^2$ and the bracket or arm $A^2$. The frame $C^2$ has a roller $E^2$, mounted in its outer end. The frame $D^2$ likewise has a roller $F^2$, pivoted in its outer end, said roller having a reduced portion $G^2$ at its lower end, which is in line with the reduced portion of the rollers upon the opposite side of the elevator-frame. This reduced portion comes in line with the lid of the lowermost box, as is best illustrated in Fig. 2. The frames $C^2$ and $D^2$ may move to a slight extent independently of each other. The lowermost member of the upper frame $D^2$ carries a pin $H^2$, which extends downwardly into a slot $I^2$, formed in the upper member of the lower frame $C^2$. A spring $J^2$ is connected at one end to the upper member of the frame $D^2$ and at its opposite end to the horizontal member $t'$ or other fixed portion of the frame. A second spring $K^2$ is connected at one end to the outer end of an arm $L^2$, extending outwardly from the frame $C^2$, while its opposite end is connected to the member S' of the elevator-frame. These springs normally tend to throw the frames and the rollers carried thereby around toward the track or way and toward the opposite series of rolls.

Pivoted to the under face or side of the track is a bar or lever $M^2$, the right-hand end of which is connected by a link $N^2$ with the lowermost member of the frame $C^2$, the lever or bar $M^2$ being provided with an upright lug or finger $O^2$, which when the parts are in working position forms a stop for the link $N^2$. The opposite end of the bar or lever $M^2$ extends out over the sheave-wheel L' and under certain circumstances comes into contact with a pin $P^2$, carried by said sheave or pulley L'. Pivotally connected to the bar or lever $M^2$ is a rod or bar $Q^2$, which extends rearwardly therefrom and passes through a lever $R^2$, fulcrumed to the side bar or member Q' at a point $S^2$. A spring $T^2$ encircles the rear end of this bar $Q^2$ and bears against the face of the lever $R^2$. The lever $R^2$ is limited in its forward movement by a pin or similar device $U^2$, which extends through the rod or bar $Q^2$. Thus while the lever $R^2$ may have a rearward movement independently of the rod or bar $Q^2$ any forward movement of the lever from the position shown in Fig. 4 will cause the rod or bar to move with it. The pivotal points of the lever $M^2$ and the link $N^2$ are such that when the parts are in the positions shown in Fig. 4 the lever $M^2$ and link $N^2$ form, in effect, a toggle-joint which will hold the frames $C^2$ and $D^2$ in the positions shown in said figure against the stress of the springs $J^2$ and $K^2$.

The block or casting $e'$ is provided with a laterally-projecting finger $V^2$, which extends out into the path of the lever $R^2$, and when said casting $e'$ is moved back to its outermost position upon the track or way said finger will engage the lever $R^2$ and swing the same about its pivot or fulcrum, compressing the spring $T^2$, and finally passing the same and permitting the lever to assume the position shown in dotted lines in Fig. 5. When, however, the hook and push member, which are carried by the casting or frame $e'$, are moved forward, the finger $V^2$ comes into contact with the lever $R^2$ and swings the same forward, the lever coming into contact with the pin $U^2$, causing the bar or rod $Q^2$ to be moved forward, and as a consequence swinging the lever $M^2$ about its pivot, thereby breaking the toggle formed by the lever $M^2$ and link $N^2$ and permitting the springs $J^2$ and $K^2$ to swing the frames $C^2$ and $D^2$ in against the side faces of the box or boxes which are being pushed into place upon the shelf. As the casting $e'$ is moved inwardly and nearly reaches its limit of inward movement the pin $P^2$ will come into contact with the end of the lever $M^2$ and swing the same, so as to cause the frames $C^2$ and $D^2$, with their rollers, to be moved back out of contact with the boxes, in which position they will remain until another box is to be replaced upon a shelf.

Inasmuch as the member which forces the boxes back into position bears against the body of the lowermost box it is necessary to the proper action of the device that the lower box receive its guiding pressure upon the bottom of the same rather than on the lid, and it is for this reason that the rolls are reduced at a point where they would come into contact with the lid of the box, the lid of course being wider than the body of the box. The upper boxes receive their guiding pressure at the top. The rolls prevent any binding of the boxes as they are moved inward. The series of rolls upon one side always guide at that side, allowing the opposite guide-roll to move slightly to accommodate itself to any irregularity in the box. Having the movable guide-roll made in two sections insures uniform friction on boxes of different widths, thereby permitting two or more boxes not of uniform width to be pushed into position upon a shelf without any difficulty whatsoever. If boxes of uniform and fixed width could be obtained in all cases, then fixed guides might be employed. This cannot in practice, however, be depended upon, as it is almost impossible to secure a series of boxes of uniform width and dimensions.

Journaled in the lower cross-head or casting N is a shaft $A^3$. This shaft has splined upon it a pinion $B^3$ and a bevel-gear $C^3$, the pinion and gear being preferably formed as one. The gear $C^3$ in turn meshes with a similar bevel-gear $D^3$, formed upon the sleeve of a drum $E^3$, which is mounted upon a shaft or axle $F^3$, extending out from the casting or frame N.

A band or cable $G^3$ is secured to the upper member of the elevator-frame or any fixed portion thereof, said band or cable passing over sheaves or pulleys $H^3$ $I^3$ and thence down to and around the drum $E^3$, about which it passes several times, its end being secured thereto. A second band or cable $J^3$ extends from the drum $E^3$ up over idlers $K^3$ and $L^3$, which latter carries the band or cable in line with the upper end of the upright column M, in which is mounted a counterweight $M^3$, the counterweight being attached to the end of the band or cable $J^3$.

Instead of forming the cables $G^3$ and $J^3$ as separate bands it will readily be understood that one stretch may be employed, it being passed about the drum $E^3$ several turns in order to secure the necessary bite or hold thereon. The drum $E^3$ is provided with a suitable cover or casing $E^5$, secured to the outer end of the shaft upon which the drum rotates. Suitable openings are provided in the cover or casing to permit the bands or cables to pass onto the drum, as is clearly indicated in the drawings.

To impart motion to the shaft $A^3$, and as a consequence to the bevel-gear $C^3$ and the drum $E^3$, I secure to the outer end of the shaft an arm or bracket $N^3$, to the end of which is fulcrumed a crank $O^3$, the inner end of which is pivotally connected to a split collar or sleeve $P^3$, which in turn works in a groove or channel formed in the outer end of a sleeve $Q^3$. Said sleeve is slidably mounted upon the shaft $A^3$, and to the inner end of said sleeve is pivotally connected one end of an elbow-lever $R^3$, said lever being fulcrumed at $S^3$ in a bracket or arm $T^3$, which extends down from the casting N. The inner end $U^3$ of said elbow-lever extends inwardly in line with the inner face of the rim of the drum $E^3$, which is provided with a series of ratchet-teeth $V^3$. A spring $W^3$ is interposed between the inner end of the elbow-lever and a lug or projection on the main frame or casting N and serves normally to depress the inner end of the lever and throw the said end $U^3$ into engagement with the ratchet-teeth. This movement will cause the sleeve $Q^3$ to move inwardly upon the shaft $A^3$ into the position shown in Fig. 6. So long as the elbow-lever or its arm $U^3$ is in engagement with the ratchet-teeth $V^3$ there can be no rotation of the frame, and consequently no raising or lowering of the elevator, through the connections above described. In order to withdraw the member $U^3$ from engagement with the ratchet-teeth on the drum, it is necessary for the operator to press the handle $X^3$, carried by the crank $O^3$, inwardly, thereby moving the sleeve $Q^3$ outwardly, the parts assuming the positions shown in Fig. 7, when the drum is free to be rotated by the rotation of the crank $O^2$. The rotation of the crank in one or the other direction will serve to raise or lower the elevator, the counterweight $M^3$ being of such weight as to practically counterbalance the weight of the elevator, and as a consequence the movement is readily and easily accomplished.

Should the operator release his hold upon the crank $O^3$ for any reason, the spring $W^3$ will immediately draw the member $U^3$ into engagement with the ratchet-teeth, thereby preventing any further movement of the drum, and consequently arresting any movement of the elevator. This prevents the elevator from descending when it is loaded with boxes, unless the attendant maintains his hold at all times upon the crank or handle, withholding the elbow lever or member $U^3$ thereof from engagement with the ratchet-teeth of the drum. As a consequence it is next to impossible for the elevator to descend too rapidly.

A buffer $Y^3$, which in the present instance takes the form of a spring, is mounted upon the casting N, in line with the main frame of the elevator.

An index-wheel $A^4$ works in conjunction with the pinion $B^3$, the marks on the face of the index-wheel, as shown in Fig. 2, being so arranged that when the pointer $B^4$ is moved to a particular mark or notation on the index-wheel the elevator will be at its proper position with relation to the shelf noted. These marks can of course be placed upon the index-wheel to suit the spacing of the various shelves.

When shelving of uneven spacing is employed, I may use an arm which will automatically determine the position of the elevator with reference to any particular shelf. This construction will now be described.

Pivoted to an upright bar or member $C^4$, which extends from the upper to the lower end of the elevator-frame, is an arm or lever $D^4$, which at its lower end is provided with a pivoted foot-piece $E^4$, said foot-piece being free to swing inwardly away from the member $C^4$, but held against movement in the opposite direction. The upper end of the member $D^4$ is pivotally connected to a link $F^4$, which in turn is likewise connected to a crank or arm $G^4$. The elongated hub $H^4$ of the crank comprises a squared shaft $I^4$, which is supported at its upper and lower ends in brackets or bearings secured, respectively, to the upper and lower cross-heads or castings I and N. The elongated hub $H^4$ of the crank $G^4$ is supported in a bracket $J^4$, which is secured to the elevator-frame. The crank $G^4$ is formed with two studs or fingers $K^4$ and $L^4$, the stud $K^4$ when the arm $D^4$ is withdrawn from the shelf coming into contact with the link $F^4$ and normally limiting the parts against further movement in that direction. The other stud $L^4$ comes into contact with the elevator-frame and prevents the lower end of the arm $D^4$ from being thrown too far inwardly. The crank $G^4$ and its connecting-link $F^4$ form, in effect, a toggle-joint, and when the arm or member $D^4$ is withdrawn from engagement with the shelf it locks and normally holds the toggle in its extended position. A spring $M^4$ is connected to the upper end of the arm $D^4$ and normally tends to throw said arm inwardly toward the shelf when the toggle is broken. Secured to the lower end of the shaft $I^4$ is a crank $N^4$, which in turn has pivotally connected to it a link or bar $O^4$. The outer end of said bar works in a slot or groove $P^4$, formed in an arm or plate $Q^4$, which arm is secured to a shaft $R^4$. Said shaft has its bearing in the casting N and extends outwardly to the forward side thereof. A second arm or plate $S^4$ is secured to the shaft $R^4$, said plate being likewise provided with a slot $T^4$, in which works one end of an arm $U^4$, the opposite end of said arm being pivotally connected to a dog or detent $V^4$, likewise mounted upon the frame N. Said dog or detent works in conjunction with a series of stop-pins $W^4$ and a cam $X^4$, formed upon or carried by the rear face of the index-wheel $A^4$. The shaft $R^4$ has also secured upon it a cam or wing $Y^4$, which works in conjunction with a finger $Z^4$, secured upon the inner end of the shaft $B'$. A crank or handle $A^5$ is secured to the outer end of the shaft $R^4$.

Assuming now that it is desired to use the elevator in connection with a series of shelves irregularly spaced and for which the index-wheel is not graduated, the attendant moves the handle $A^5$, which, through the connection of plate $Q^4$, link $O^4$, crank $N^4$, and squared shaft $I^4$, will cause the toggle formed between the crank $G^4$ and link $F^4$ to be broken, thereby permitting the spring $M^4$ to throw the lower end of the lever $D^4$ inwardly. Upon moving the elevator up the arm or lever will bear against the shelf as it passes the same, and as soon as the pivoted end of the arm comes in line with the upper face of the shelf the arm will move inwardly. A retrograde movement of the elevating-crank will then cause the foot-piece of arm $D^4$ to engage the shelf, which will bring the elevator into its proper position with reference to the particular shelf in question. The carrier is then moved inwardly to engage the box and after this engagement is drawn outwardly, bringing a box with it. As this is done the finger $Z^4$ comes into contact with the cam or wing $Y^4$, thereby rotating the shaft $R^4$ and causing a rotation of the squared shaft $I^4$, which in turn will straighten the toggle at the upper end, formed by the crank $G^4$ and link $F^4$, withdrawing the arm $D^4$ from engagement with the shelf just as the box nears its limit of outward movement onto the elevator. The parts are then in the positions shown in full lines in Fig. 10, and it will be seen that the elevator, with the boxes thereon, is free to be moved downward. If the attendant should have made a mistake as to the particular shelf and desires to bring the elevator to a point below without removing the box from the upper shelf, it of course is necessary to withdraw the arm $D^4$ from engagement with the shelf. This can be done by simply manipulating the handle $A^5$, rotating the shaft $R^4$ in the same manner as it is rotated by the action of the finger $Z^4$ and the wing $Y^4$.

The dog or detent $V^4$, when the arm $D^4$ passes into engagement with one of the shelves, extends over one of the stop-pins $W^4$ on the inner face of the index-wheel $A^4$, thereby locking the parts of the apparatus and preventing any downward movement of the elevator until such time as the dog or detent is withdrawn from engagement with the pin. This is automatically accomplished by the movement of the carrier or casting $e'$ in the act of withdrawing a box, or, as just stated, by a manual operation of the handle $A^5$ and the consequent rotation of the shaft $R^4$.

Should the arm or lever $D^4$ for any reason be left out as the elevator approaches its lowermost position, the cam $X^4$ will act upon the detent $V^4$, rocking the shaft $R^4$, and consequently drawing the arm $D^4$ back to its normal or vertical position.

A cam face or finger $B^5$ may be secured to the under face of the elevator-frame in line with the crank $N^4$, so that when the elevator descends to its lowest position said cam or finger will come into contact with a beveled face on the crank $N^4$ and cause the rotation of the shaft $I^4$, so as to positively withdraw the arm $D^4$ to its vertical position.

It is manifest that the index-wheel will, as above stated, be all sufficient when the apparatus is used in connection with shelves which are evenly or regularly spaced. If, however, the apparatus is to be used in conjunction with evenly and unevenly spaced shelving, the two devices should be embodied in the same machine.

The invention is susceptible of various modifications. For instance, in Fig. 14 a modified form of track for the device for removing and replacing the boxes is shown. This consists simply of two bars $A^6$ $A^6$, having grooves or channels formed in their adjacent faces. Between the bars thus formed there is placed a hook $B^6$, having wings which project out into the groove or channel to properly hold and guide the hook. With this construction, as with the form of track previously described, it is to be noted that the upper face is perfectly smooth and unobstructed and that the cable or band used for operating the hook lies in a plane below the upper surface of the bars. It is essential, of course, that the carrier present a smooth face or surface upon which the boxes may be drawn out.

In Fig. 12 a modified form of hook is shown, where instead of employing a separate member for pushing the boxes back into position the hook also performs this function. In this form the hook comprises two side bars or members $C^6$, which lie in a plane below the laterally-extending wings of the track. Inwardly-projecting lugs $D^6$, extending from the side members $C^6$, engage the under faces of the wings of the track, properly holding the hook in position on the track. The forward ends of the members $C^6$ are connected by a cross-bar $E^6$, from which extends a hook having a flat forward face $F^6$ and a rearwardly-inclined finger or end $G^6$. This construction serves, as above stated, to withdraw the boxes and also to replace them, though the construction first described is preferred, inasmuch as the hook must of necessity when the boxes are being replaced drop downward to a certain extent at the final movement thereof as the box about reaches its position upon the shelf. With both forms, however, the hook after being disengaged from the bail on the box moves backward under the sheave at the end of the track, which of course withdraws the hook from the box and the edge of the shelving and in the form first described likewise moves the pressure arms or fingers in a rearward direction to a slight extent. This is best shown in the dotted-line position in Fig. 3.

In Fig. 13 a further modification of the apparatus is shown, wherein instead of replacing boxes and the like upon shelving the reciprocating member mounted upon the elevator is shown as provided with a long hook or bar $H^6$, which, as indicated in said figure, may be used for placing satchels or the like upon shelves or may be employed for hanging up various articles upon hooks.

In Fig. 15 a device is shown for indicating the position of the elevator with reference to any particular shelf. This is designed to be used in place of the index-wheel and the arm or lever $D^4$ or to work in conjunction with the latter. It consists simply of an arm $I^6$, pivoted at the inner end of the carrier and adapted to come into contact with the shelf as the carrier or elevator moves past the same, so that the arm will be tipped about its pivot, throwing the under member thereof out in a horizontal position, so that it may be clearly seen from below.

The apparatus as a whole is shown in perspective in Fig. 16, a slightly-modified construction of the locking device and rail being illustrated therein, and also in detail in Fig. 17. The lower rail $E^7$ in this instance is secured directly to the shelving or the like by a series of round-headed screws $E^8$, the screws being placed at determinate or fixed points in order that the heads thereof may also act as stops to arrest the travel of the apparatus and lock it in its adjusted position at any desired point along the length of the rail.

Instead of employing a bolt, as T, which is projected into the openings in the rail, as above described, there is attached to the arm V a bolt $E^9$, which is provided at its outer end with a shoe or head $E^{10}$, the outer face of which is rounded or beveled to each side of a central seat or depression E¹², formed therein. The bolt and its head or shoe are operated in the same manner as the sliding bolt T, the remaining portions of the mechanism being the same throughout, except for a slight difference in proportions.

As will be readily understood, the main frame is moved along by hand or through the agency of the rope or cable *f* to the desired point, and then the handle Y is actuated, which causes the bolt to move forward and the shoe or head to engage the head of the screw immediately in front of the same. By beveling the forward face of the shoe it may be readily caused to pass onto and in engagement with the screw-heads if for any reason the bolt and head should not be in their retracted position as the frame is moved along the tracks.

The invention is also susceptible of modification in various of its details, and I do not desire to be understood as limiting myself to the precise arrangement and construction of the parts as herein shown and described.

It is of course evident that the precise arrangement of driving mechanisms is not essential to the generic invention, and the claims should be read with this understanding. It is likewise evident that friction devices may be employed instead of the positive locking mechanism above set forth for locking the elevator. So, too, certain portions of the mechanism, especially the means for raising and lowering the elevator and the hook-actuating means, may be driven or controlled by power—as, for instance, by electric motors or the like.

Having thus described my invention, what I claim is—

1. In an apparatus of the character described, the combination of a frame; means for supporting the same in front of a series of shelves or the like; an elevator movable up and down upon said frame; and means carried by the elevator for engaging merchandise on the shelves, withdrawing it onto the elevator, and replacing the same at will, said means automatically disengaging itself when the merchandise is properly stored, substantially as described.

2. In an apparatus of the character described, the combination of a supporting-frame; an elevator movable up and down with reference to the frame; and means movable back and forth on the elevator for removing merchandise from and replacing the same upon its support, said means passing to a plane below its normal line of travel as it reaches its limit of inward movement and passes out of contact with the merchandise, whereby said means is withdrawn from contact with and out of line of the merchandise and its support.

3. In an apparatus of the character described, the combination of a supporting-frame; an elevator movable up and down with reference thereto; and means movable back and forth on said elevator for removing merchandise from and replacing the same upon its support, said means as it reaches its limit of inward movement being automatically withdrawn from contact with and out of line of the merchandise and its support.

4. In an apparatus of the character described, the combination of a supporting-frame; an elevator movable up and down with reference thereto; means movable back and forth on said elevator for removing merchandise from and replacing the same upon its support, said means passing to a plane below, and back beneath, its normal line of travel as it reaches its limit of inward movement, whereby it is withdrawn from contact with and out of line of the merchandise and its support; and devices for operating said means.

5. In an apparatus of the character described, the combination of a supporting-frame; an elevator movable up and down with reference thereto; means movable back and forth on said elevator for removing merchandise from and replacing the same upon its support, said means as it reaches its limit of inward movement being by a continuous movement automatically withdrawn from contact with and out of line of the merchandise and its support; and mechanism for operating said means.

6. In an apparatus of the character described, the combination of a supporting-frame; an elevator movable up and down with reference thereto; means movable back and forth on said elevator for removing merchandise from and replacing the same upon its support; an operating-shaft carried by the frame; a wheel slidably mounted upon said shaft; and connections intermediate said wheel and the means for handling the merchandise.

7. In an apparatus of the character described, the combination of a supporting-frame; an elevator movable up and down with reference thereto; means movable back and forth on said elevator for removing merchandise from and replacing the same upon its support; an operating-shaft carried by the frame; a sheave-wheel slidably mounted on the shaft and carried by the elevator; and a belt for transmitting motion from the sheave to the means carried by the elevator.

8. In an apparatus of the character described, the combination of a supporting-frame; an elevator movable up and down with reference thereto; means movable back and forth on said elevator for removing merchandise from and replacing the same upon its support; an operating-shaft carried by the frame; a sheave-wheel slidably connected to the shaft and carried by the elevator; a belt for transmitting motion from the sheave to the means carried by the elevator; and means for limiting the rotation of the shaft in either direction.

9. In an apparatus of the character described, the combination of a supporting-frame; an elevator movable up and down with reference thereto; means movable back and forth on said elevator for removing merchandise from and replacing the same upon its support; a vertical shaft carried by said frame; connections intermediate said shaft and the means carried by the elevator for operating said means; means for limiting the rotation of said shaft; and means for causing a slight retrograde movement of the shaft and holding it in such position, substantially as and for the purpose described.

10. In an apparatus of the character described, the combination of a supporting-frame; an elevator movable up and down with reference thereto; means movable back and forth on said elevator for removing merchandise from and replacing it upon its support; an operating-shaft carried by the frame; a sheave-wheel slidably connected to the shaft and carried by the elevator; a belt for transmitting motion from the sheave to the means carried by the elevator; means for limiting the rotation of the shaft; and means for causing a slight retrograde movement of the shaft and holding it in such position, substantially as described.

11. In an apparatus of the character described, the combination of a supporting-frame; an elevator movable up and down with reference thereto; means movable back and forth on said elevator for removing merchandise from and replacing it upon its support; an operating-shaft carried by the frame; a sheave-wheel slidably connected to the shaft and carried by the elevator; a belt for transmitting motion from the sheave to the means carried by the elevator; a second shaft carried by the lower end of the frame; means connecting said shaft with the operating-shaft; and a crank carried by the outer end of said second shaft.

12. In an apparatus of the character described, the combination of a supporting-frame; an elevator movable up and down with reference thereto; means movable back and forth on said elevator for removing merchandise from and replacing it upon its support; an operating-shaft carried by the frame; a sheave-wheel slidably connected to said shaft and carried by the elevator; a belt for transmitting motion from the sheave to the means carried by the elevator; a second shaft carried by the lower end of the frame; means connecting said second shaft with the operating-shaft; a crank carried by the outer end of said second shaft; and means for limiting the rotation of the crank in one or the other direction, substantially as described.

13. In an apparatus of the character described, the combination of a supporting-frame; an elevator movable up and down with reference thereto; a track carried by said elevator; a member slidably mounted upon said track; a shaft carried by the frame; a sheave-wheel carried by the elevator and slidably connected with said shaft; and a band or cable passing about the sheave and connected to the slidable member, said band lying in a plane below the upper face of the track, substantially as and for the purpose described.

14. In an apparatus of the character described, the combination of a supporting-frame; an elevator movable up and down with reference thereto; a track carried by said elevator; a member slidably mounted upon said track; a hook pivotally connected to said member; a shaft carried by the frame; a sheave-wheel carried by the elevator and slidably connected to the shaft; and a band or cable passing about said sheave and connected to the hook, said band lying in a plane below the upper face of the track, substantially as described.

15. In an apparatus of the character described, the combination of a supporting-frame; an elevator movable up and down with reference thereto; a track carried by said elevator; a member slidably mounted upon the track; a hook pivotally connected to said member; a push-bar or member also pivotally connected to said slidable member; a shaft carried by the frame; a sheave-wheel carried by said elevator and slidably connected to the shaft; and a band or cable passing about said sheave, said band being connected to the hook, substantially as described.

16. In an apparatus of the character described, the combination of a supporting-frame; an elevator movable up and down with reference thereto; a track carried by said elevator, said track having a trough-shaped portion and laterally-extending wings; a block slidably mounted upon said track; a hook pivotally connected to the block; a push-bar or member also pivotally connected to the block; idlers mounted at the forward and rear ends of the track; a shaft; a sheave-wheel slidably mounted upon said shaft and carried by the elevator; and a band or cable passing about said sheave over the sheaves at the ends of the track and connected to the hook, substantially as described.

17. In combination with a track, a block slidably mounted thereon; a hook pivotally connected to the block and extending up and over the upper face of the track; a frame pivotally connected to the block, said frame carrying at its forward end vertically-disposed arms; and means for reciprocating the block and its attached members back and forth upon the track, whereby when the block moves forward to the extreme end of the track the hook may drop down below the track, while the push-bar or member maintains its direct contact with the merchandise being handled, substantially as and for the purpose described.

18. In an apparatus of the character described, the combination of a frame; means for supporting the same in front of a series of shelves or the like; an elevator movable up and down upon said frame; means carried by the elevator for engaging merchandise on the shelves, withdrawing the same onto the elevator, and replacing the merchandise at will; and means acting directly on the merchandise as it is moved off of the elevator onto the shelf or like support to properly guide the same.

19. In an apparatus of the character described, the combination of a frame; means for supporting the same in front of a series of shelves or the like; an elevator movable up and down upon said frame; means carried by the elevator for engaging merchandise on the shelves, withdrawing the same onto the elevator, and replacing the merchandise at will upon the shelves, said means automatically disengaging itself when the merchandise is properly stored; and means for positioning the merchandise as it is moved back from the elevator onto the shelf or like support, said means acting only on the merchandise as it is moved on the elevator toward the shelf, substantially as described.

20. In an apparatus of the character described, the combination of a supporting-frame; an elevator movable up and down with reference to the frame; means movable back and forth on the elevator for removing merchandise from and replacing the same upon its support, said means automatically disengaging itself when the merchandise is properly stored; devices for guiding the merchandise as it is moved along the elevator toward the shelf; and mechanism for automatically bringing said devices into operation as the merchandise is being moved toward its support, substantially as described.

21. In an apparatus of the character described, the combination of a supporting-frame; an elevator movable up and down with reference to the frame; means movable back and forth on the elevator for removing merchandise from and replacing the same upon its support, said means automatically disengaging itself when the merchandise is properly stored; guide-rolls acting upon the merchandise to properly position the same, said rolls acting only as the merchandise is being moved inward toward its support; and means for bringing said rolls automatically into operation.

22. In an apparatus of the character described, the combination of an elevator; means carried thereby for removing merchandise from and replacing the same upon its support; guide-rolls for properly positioning the merchandise as it is being moved inward toward its support; and means for operating said guide-rolls to bring them into position when the merchandise is being replaced and to move them out of the path of the merchandise when the same is being withdrawn from its support onto the elevator.

23. In an apparatus of the character described, the combination of an elevator; means carried thereby for removing merchandise from and replacing the same upon its support; a series of fixed guide-rolls arranged at one side of the elevator; a bodily-movable guide-roll arranged upon the opposite side of the elevator; and means for bringing said movable roll into operation as the merchandise is being moved off of the elevator onto its support, substantially as described.

24. In an apparatus of the character described, the combination of an elevator; means movable back and forth on the elevator for removing merchandise from and replacing the same upon its support; a series of fixed guide-rolls arranged at one side of the elevator; a two-part swinging frame mounted upon the opposite side of the elevator; a two-part roll carried by said frame; means for swinging said frame to bring it in position as the merchandise is moved from the elevator to its support; and means for swinging the frame in a reverse direction as the merchandise is finally moved from the elevator, substantially as described.

25. In an apparatus of the character described, the combination of an elevator; means movable back and forth on the elevator for removing merchandise from and replacing the same upon its support; a series of fixed guide-rolls arranged at one side of the elevator, said rolls being provided with reduced portions or sections near their lower ends; a two-part swinging frame mounted upon the opposite side of the elevator; a two-part roll carried by said frame, said roll having a reduced portion in line with the reduced portions of the opposite rolls; means for swinging said frame toward the series of rolls as the merchandise is being moved from the elevator toward its support; and means for swinging the frame in the opposite direction as the merchandise is finally moved from the elevator.

26. In an apparatus of the character described, the combination of a frame; an elevator movable up and down upon said frame; means movable back and forth on the elevator for withdrawing merchandise from and replacing the same upon its support; a shaft carried by the frame; means for operating the shaft; a sheave-wheel supported by the elevator and slidably connected to the shaft; a band or cable passing about the sheave and connected to the slidable means mounted upon the elevator; a series of guide-rolls mounted upon one side of the elevator; a movable guide-roll mounted upon the opposite side of the elevator; means interposed between the movable guide-roll and the slidable means mounted on the elevator for automatically throwing said roll into engagement with the merchandise as the slidable means moves inward to replace the merchandise upon its support; and means carried by the sheave-wheel for automatically throwing the roll away from the merchandise as it nears its limit of inward movement.

27. In an apparatus of the character described, the combination of a frame; an elevator movable up and down upon said frame;

means movable back and forth upon the elevator for withdrawing merchandise from and replacing the same upon its support; a vertical shaft carried by the frame; connections intermediate said shaft and the means carried by the elevator; and means for operating the shaft.

28. In an apparatus of the character described, the combination of a supporting-frame; an elevator movable up and down upon said frame; a slidable block or member mounted upon the elevator for removing merchandise from and replacing it upon its support; a shaft supported by the frame; a sheave-wheel carried by the elevator and slidably connected to the shaft; a band or cable passing about the sheave and connected with the slidable member; a series of fixed rolls mounted at one side of the elevator; a swinging frame mounted upon the opposite side of the elevator; a bodily-movable roll carried by said frame; an arm pivotally attached to the under side of the elevator; a link connecting one end of the arm to the swinging frame; a pin extending up from the sheave in line with the opposite end of the pivoted arm; a bar or rod pivoted to said arm and extending outwardly toward the outer end of the elevator-frame; a lever pivoted to the frame and embracing said latter rod, said lever being free to move in one direction; and means carried by the slidable member for engaging said lever and moving the parts substantially as described, whereby as said member begins its inward movement the movable roll is thrown over toward the series of fixed rolls, and as said member nears its limit of inward movement the roll is automatically thrown back away from the merchandise.

29. In an apparatus of the character described, the combination of a supporting-frame having vertically-disposed columns; an elevator movable up and down upon said columns; a pair of brackets extending out from the upper and lower ends of said elevator in line with one of the columns; four guide-rolls carried by each of said brackets arranged to bear at diametrically opposite points upon said column; a second pair of brackets carried by the elevator-frame in line with the opposite column; and a single pair of rolls carried by each of said brackets, said latter rolls bearing upon the second column in a line at right angles to a plane intersecting the two columns.

30. In an apparatus of the character described, the combination of a main supporting-frame; an elevator movable up and down upon said frame; means for raising and lowering said elevator; means carried by the elevator for withdrawing merchandise from and replacing it upon its support; a positioning device carried by the elevator to bring it in proper alinement with a shelf or like support; and connections intermediate the means for withdrawing the merchandise and said positioning device, whereby when the merchandise is withdrawn onto the elevator the device for properly positioning the shelf is likewise automatically withdrawn from engagement with the shelf, substantially as described.

31. In an apparatus of the character described, the combination of a main supporting-frame; an elevator mounted thereon; means for raising and lowering said elevator; means movable back and forth on the elevator for removing merchandise from and replacing it upon its shelf or like support; a device carried by the elevator for properly positioning the elevator with reference to a shelf; connections for moving said means back and forth upon the elevator; and independent connections for withdrawing the positioning device from the shelf as the merchandise reaches its limit of outward movement, substantially as described.

32. In an apparatus of the character described, the combination of a supporting-frame; an elevator movable up and down thereon; means carried by the elevator for withdrawing merchandise from and replacing the same upon its shelf or like support; a positioning device carried by the elevator; an operating-shaft carried by said frame; connections intermediate said shaft and the positioning device; a counter-shaft carried at the lower end of the frame; connections intermediate said counter-shaft and the operating-shaft for rotating the latter and withdrawing the positioning device from engagement with the shelf when said counter-shaft is moved in one direction; and connections intermediate said counter-shaft and the means carried by the elevator for operating said means, substantially as described.

33. In an apparatus of the character described, the combination of a main frame; an elevator movable up and down thereon; means movable back and forth on the elevator for withdrawing merchandise from and replacing the same upon its support; a positioning device carried by the elevator for securing the proper position of the elevator with reference to a shelf; guiding devices carried by the elevator adapted and arranged to properly position the merchandise as it is moved inwardly on the elevator; a crank or handle; and connections intermediate said crank or handle and the means, the positioning device and the guiding devices to operate the same in their set order, substantially as described.

34. In an apparatus of the character described, the combination of a main frame; an elevator movable up and down thereon; means for raising and lowering said elevator; means movable back and forth on the elevator for removing merchandise from and replacing the same upon its support; a positioning device carried by the elevator; an operating-shaft carried by the frame; connections intermediate said shaft and the positioning device; a counter-shaft; connections between said counter-shaft and the operating-shaft for actuating the same to withdraw the positioning device from engagement with a shelf; and mechanism intermediate said connections and the means for raising and lowering the elevator to prevent the operation of said latter means until the positioning device has been withdrawn from engagement with the shelf.

35. In an apparatus of the character described, the combination of a main frame; an elevator mounted thereon; a positioning device for said elevator; an operating-shaft carried by the main frame; connections intermediate said shaft and the positioning device; a counter-shaft; a finger carried by one end of said counter-shaft; a cam or wing mounted upon a third shaft carried by the frame; connections intermediate said shaft and the operating-shaft; and a handle carried by the outer end of said third shaft, substantially as and for the purpose described.

36. In an apparatus of the character described, the combination of a main frame; an elevator carried thereby; a positioning device mounted upon the elevator; an operating-shaft carried by the main frame; connections intermediate said operating-shaft and the positioning device; a counter-shaft; a finger carried by said counter-shaft; a third shaft carried by the main frame; a wing carried by said shaft in line with the finger; connections intermediate said third shaft and the operating-shaft; a handle carried by said third shaft; means for raising and lowering the elevator; and connections intermediate said third shaft and said means whereby the means for raising and lowering the elevator will be locked against movement until the positioning device has been withdrawn from the shelf, substantially as described.

37. In an apparatus of the character described, the combination of a main frame; an elevator mounted thereon; a sheave or drum carried by the main frame; a band or cable passing about said sheave and connected to the elevator for raising and lowering the same; a counter-shaft; a gear carried by said counter-shaft and in mesh with a gear carried by the sheave; a crank connected to the counter-shaft; and a locking device connected to the crank and adapted to lock the sheave against rotation until the crank is moved axially, substantially as described.

38. In an apparatus of the character described, the combination of a main frame; an elevator mounted thereon; a sheave or drum carried by said main frame; a band or cable passing about said sheave and connected to the elevator for raising and lowering the same; a counter-shaft; a gear mounted on the counter-shaft and in mesh with a similar gear formed on the sheave; a crank mounted upon the counter-shaft; a sliding sleeve mounted upon the counter-shaft and pivotally connected to the crank; an elbow-lever pivoted to the main frame and likewise connected to the sleeve; a series of teeth formed upon the inner face of the sheave or drum in line with one end of the elbow-lever; and a spring for normally throwing said elbow-lever into engagement with the teeth.

39. In an apparatus of the character described, the combination of a main frame; an elevator mounted thereon; a sheave or drum carried by said main frame; a band or cable passing about said sheave and connected to the elevator for raising and lowering the same; a counter-shaft; a gear mounted on the counter-shaft and in mesh with a similar gear formed on the sheave; a crank mounted upon the counter-shaft; a sliding sleeve mounted upon the counter-shaft and pivotally connected to the crank; an elbow-lever pivoted to the main frame and likewise connected to the sleeve; a series of teeth formed on the sheave or drum; and a spring for normally throwing said elbow-lever into engagement with the teeth.

40. In combination with upper and lower tracks; a frame supported by said tracks and movable along the same; a sliding bolt carried by the frame in line with one of the tracks; a band or cable extending throughout the length of the track; and connections intermediate said band or cable and the bolt, whereby said bolt may be disengaged from the track and the frame traversed along the same to the desired point, substantially as described.

41. In an apparatus of the character described, the combination of upper and lower supporting-tracks; a frame mounted thereon; a spring-pressed bolt carried by the frame in line with one of the tracks; means for disengaging said bolt; and an endless band or cable connected to said means; said band or cable extending throughout the length of the track, whereby the bolt may be disengaged by a movement of the band or cable in either direction and the apparatus moved along the tracks to any desired point, substantially as described.

42. In an apparatus of the character described, the combination of upper and lower supporting-tracks; a frame mounted and movable upon said tracks; a spring-pressed bolt carried by said frame in line with one of the tracks; means for automatically disengaging said bolt; an endless band or cable extending throughout the length of the track and connected to said means; and devices for keeping said band or cable under tension.

43. In an apparatus of the character described, the combination of upper and lower supporting-tracks; a frame mounted upon and movable lengthwise of said tracks; a spring-pressed sliding bolt carried by said frame in line with one of the tracks; a spring-pressed plunger; a pivoted block arranged to move said plunger in a direction in opposition to its spring; an endless band or cable connected to said block and arranged to swing the same about its pivot; and devices connected to the bolt acted upon by the plunger as it is moved rearwardly, whereby the bolt is withdrawn from engagement with the track, substantially as described.

44. In an apparatus of the character described, the combination of upper and lower supporting-tracks; a frame mounted and movable thereon; a sliding spring-pressed bolt carried by said frame in line with one of the tracks; an arm pivotally mounted upon the frame in rear of the bolt; a link connecting said arm and the bolt; a spring-pressed plunger mounted upon the frame in line with the upper end of said arm; a pivoted block arranged to force the plunger rearwardly in opposition to its spring; and an endless band or cable connected to said block and extending throughout the length of the track, substantially as described.

45. In an apparatus of the character described, the combination of upper and lower tracks; a frame mounted upon said tracks; a bolt carried at the upper and lower ends respectively of said frame in line with the tracks; connections intermediate said bolts for operating the same in unison; means carried by the frame for acting on the lower bolt, and through the connections above described likewise acting on the upper bolt; and an endless band or cable extending throughout the length of the lower track, said band or cable being connected with means for operating the lower bolt, substantially as described.

46. In an apparatus of the character described, the combination of a track; a series of securing devices for said track, the heads whereof project beyond the face of the track; a frame slidably mounted on the track; and a locking device carried by the frame and engaging one or another of said heads as the frame is moved along the track, substantially as described.

47. In an apparatus of the character described, the combination of a track; a series of securing devices for said track, the heads whereof project beyond the face of the track; a frame slidably mounted on the track; and a bolt carried by the frame, said bolt having a head with a recess or socket formed therein for engaging one or another of the heads of the securing device, substantially as described.

48. In an apparatus of the character described, the combination of a track; a traveling frame mounted thereon; an elevator carried by said frame; a band or cable connected to the frame, said band extending along within reach of the operator; and a yielding device for keeping said band under tension.

49. In an apparatus of the character described, the combination of a supporting-frame; an elevator movable up and down with reference thereto; means mounted on said elevator for withdrawing merchandise from its support and replacing the same thereon, said means being movable on the elevator toward the support, then vertically in line therewith, and backwardly therefrom in a plane out of line with the original forward movement, and likewise movable back through the same path of travel; and mechanism for operating said means.

50. In an apparatus of the character described, the combination of a supporting-frame; an elevator movable up and down with reference thereto; a hook mounted on said elevator for withdrawing merchandise from its support and replacing the same thereon, said hook being movable toward the support, then vertically in line therewith, and backwardly therefrom in a plane out of line with the original forward movement, and likewise movable back through the same path of travel; and means for operating said hook.

51. In an apparatus of the character described, the combination of a supporting-frame; an elevator movable up and down with reference thereto; a track carried by said elevator; a hook for removing merchandise from and replacing the same upon its support, said hook being movable back and forth upon the elevator; and means for operating the hook.

52. In an apparatus of the character described, the combination of a supporting-frame; an elevator movable up and down with reference to the frame; a member slidably mounted upon said elevator; a hook pivotally connected to said slidable member; and means for operating the hook to cause it to withdraw merchandise from and replace the same upon its support.

53. In an apparatus of the character described, the combination of a supporting-frame; an elevator movable up and down with reference thereto; a track secured upon said elevator; a member slidably mounted upon the track; a hook pivotally connected to said member; a push bar or member also pivotally connected to said slidable member; and means for traversing the slidable member.

In testimony whereof I have signed my name to this specification in the presence of two subscribing witnesses.

NILS O. STARKS.

Witnesses:
WM. R. BAGLEY,
WM. T. LESLIE.